United States Patent
Chen et al.

(10) Patent No.: US 8,536,909 B1
(45) Date of Patent: Sep. 17, 2013

(54) POWER GOOD SIGNAL GENERATING CIRCUIT

(71) Applicants: Chun-Sheng Chen, New Taipei (TW); Hua Zou, Wuhan (CN)

(72) Inventors: Chun-Sheng Chen, New Taipei (TW); Hua Zou, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/656,545

(22) Filed: Oct. 19, 2012

(30) Foreign Application Priority Data

Mar. 27, 2012 (CN) .......................... 2012 1 0083901

(51) Int. Cl.
*H03L 7/00* (2006.01)
(52) U.S. Cl.
USPC .......................................... 327/143; 327/198
(58) Field of Classification Search
USPC ............................................. 327/142, 143, 198
See application file for complete search history.

(56) References Cited

U.S. PATENT DOCUMENTS

| | | | | |
|---|---|---|---|---|
| 3,590,275 | A | * | 6/1971 | Fisher .............................. 327/79 |
| 3,725,675 | A | * | 4/1973 | Olsen ............................ 327/518 |
| 4,159,431 | A | * | 6/1979 | Roozenbeek et al. ........ 327/198 |
| 4,254,347 | A | * | 3/1981 | Ray .................................. 327/143 |
| 4,754,166 | A | * | 6/1988 | Nagano ........................ 327/143 |
| 5,081,625 | A | * | 1/1992 | Rhee et al. ...................... 714/55 |
| 5,313,112 | A | * | 5/1994 | Macks .......................... 327/143 |
| 5,442,312 | A | * | 8/1995 | Walter .......................... 327/198 |
| 5,617,048 | A | * | 4/1997 | Ward et al. .................... 327/143 |
| 5,704,038 | A | * | 12/1997 | Mueller et al. .................. 714/55 |
| 5,852,377 | A | * | 12/1998 | Pitsch ........................... 327/143 |
| 6,456,108 | B1 | * | 9/2002 | Schmied et al. ................. 326/31 |
| 7,205,808 | B2 | * | 4/2007 | You et al. ...................... 327/198 |
| 7,586,346 | B2 | * | 9/2009 | Xiong ........................... 327/143 |
| 7,616,031 | B2 | * | 11/2009 | Li et al. ......................... 327/142 |
| 8,283,954 | B2 | * | 10/2012 | Chao et al. .................... 327/143 |
| 2007/0096786 | A1 | * | 5/2007 | Hsieh ............................ 327/198 |
| 2010/0156478 | A1 | * | 6/2010 | Dai et al. ....................... 327/143 |
| 2010/0223485 | A1 | * | 9/2010 | Zou ............................... 713/340 |

* cited by examiner

*Primary Examiner* — William Hernandez
(74) *Attorney, Agent, or Firm* — Altis Law Group, Inc.

(57) ABSTRACT

A circuit includes first to fifth resistors and first to third electronic switches. The circuit allows a signal from a first terminal of the second electronic switch to change from a low level to a high level gradually, and to change from a high level to a low level abruptly.

7 Claims, 1 Drawing Sheet

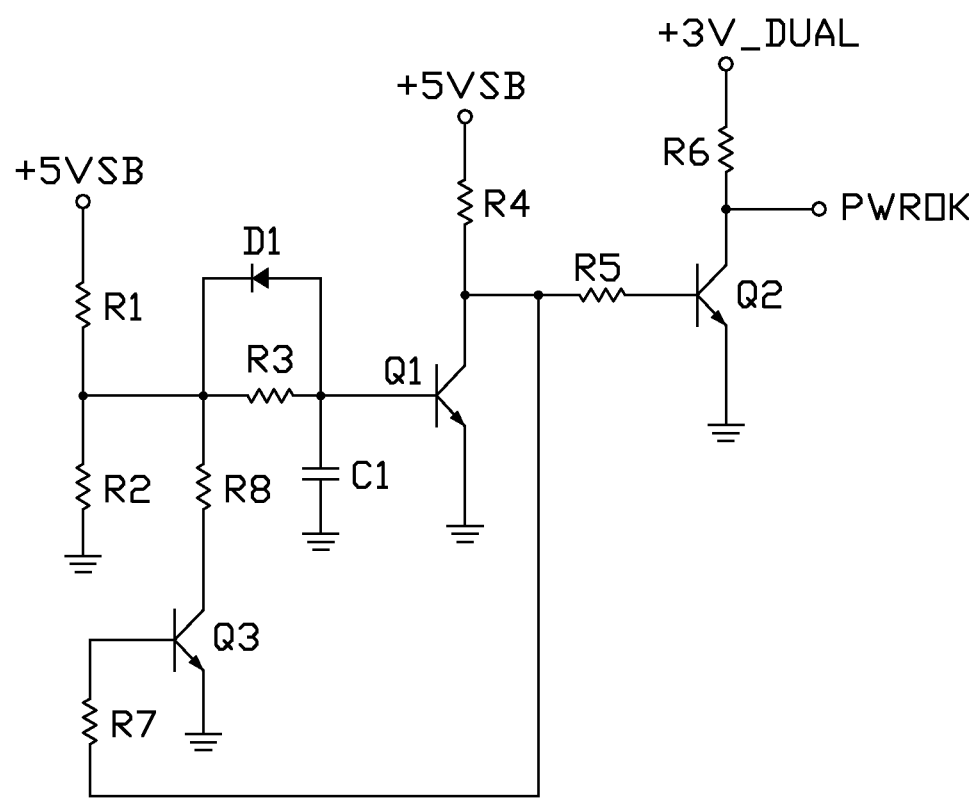

POWER GOOD SIGNAL GENERATING CIRCUIT

BACKGROUND

1. Technical Field

The present disclosure relates to a signal generating circuit.

2. Description of Related Art

In motherboards, the period of time within which signals change needs to be specially designed. For example, a power good signal needs to be changed from a low level to a high level gradually, and changed from a high level to a low level rapidly. It is costly to design and manufacture circuitry to achieve these working parameters.

BRIEF DESCRIPTION OF THE DRAWING

Many aspects of the embodiments can be better understood with reference to the following drawing. The components in the drawings are not necessarily drawn to scale, the emphasis instead being placed upon clearly illustrating the principles of the present embodiments.

The FIGURE is a circuit diagram of an exemplary embodiment of a signal generating circuit.

DETAILED DESCRIPTION

The disclosure, including the accompanying drawing, is illustrated by way of examples and not by way of limitation. It should be noted that references to "an" or "one" embodiment in this disclosure are not necessarily to the same embodiment, and such references mean "at least one."

Referring to the FIGURE, an exemplary embodiment of the signal generating circuit is illustrated, the signal generating circuit outputs a power good signal PWROK. The signal generating circuit is set on a motherboard. The signal generating circuit processes a signal to be output as a PWROK signal developing gradually from a low level to a high level, and to output a reverse signal (from a high level to a low level) rapidly.

The signal generating circuit includes resistors R1-R8, a capacitor C1, a diode D1, and transistors Q1-Q3. A standby power terminal +5 VSB on the motherboard is grounded through the resistors R1 and R2 connected in series. A node between the resistors R1 and R2 is grounded through the resistor R3 and the capacitor C1 connected in series. A cathode of the diode D1 is connected to the node between the resistors R1 and R2. An anode of the diode D1 is connected to a node between the resistor R3 and the capacitor C1. The resistors R1 and R2 make up a voltage divider circuit.

A base of the transistor Q1 is connected to the node between the resistor R3 and the capacitor C1. An emitter of the transistor Q1 is grounded. A collector of the transistor Q1 is connected to the standby power terminal +5 VSB through the resistor R4. The collector of the transistor Q1 is further connected to a base of the transistor Q2 through the resistor R5. An emitter of the transistor Q2 is grounded. A collector of the transistor Q2 is connected to a dual power terminal +3V_DUAL on the motherboard through the resistor R6. The collector of the transistor Q2 outputs a signal PWROK as a power good signal.

A base of the transistor Q3 is connected to the collector of the transistor Q1 through the resistor R7. An emitter of the transistor Q3 is grounded. A collector of the transistor Q3 is connected to the cathode of the diode D1 through the resistor R8.

When an external power supply is connected to the motherboard, a voltage received by the standby power terminal +5 VSB is increased from 0 volt to 5 volts. When the voltage received by the standby power terminal +5 VSB is less than 4.3 volts, according to the resistances of the resistors R1, R2, and R3, a voltage at the base of the transistor Q1 is less than a turn-on voltage of the transistor Q1 (which is equal to 0.65 volts) such that the transistor Q1 is turned off. The transistors Q2 and Q3 are turned on. The collector of the transistor Q2 outputs a low level signal, namely the signal PWROK is at a low level.

When the voltage received by the standby power terminal +5 VSB is 4.7 volts, the voltage at the base of the transistor Q1 is 0.65 volts. The transistor Q1 is turned on, and the transistors Q2 and Q3 are turned off. The collector of the transistor Q2 outputs a high level signal, that is to say the signal PWROK is then at a high level and has become the power good signal.

When the voltage received by the standby power terminal +5 VSB is stable, namely the voltage received by the standby power terminal +5 VSB is 4.7 volts to 5 volts, the power good signal PWROK is maintained at a high level.

When the external power supply is disconnected from the motherboard, the voltage received by the standby power terminal +5 VSB is decreased from 5 volts to 0 volts. As long as the voltage received by the standby power terminal +5 VSB is greater than 4.7 volts, the power good signal PWROK is maintained at a high level. When the voltage being received by the standby power terminal +5 VSB is less than 4.7 volts, the base of the transistor Q1 is less than 0.65 volts, such that the transistor Q1 is turned off. At this time, the collector of the transistor Q1 is at a high level. The transistor Q3 is turned on. The transistor Q2 is turned on, such that the collector of the transistor Q2 is at a low level. In other words, the high level signal indicating PWROK drops instantly to a low level signal.

From the above description, when the voltage received by the standby power terminal +5 VSB is increased to at least 4.7 volts from 0 volts, the power good signal PWROK changes over a period of time from a low level to a high level. When the voltage received by the standby power terminal +5 VSB is reduced to at least 4.7 volts from 5 volts, the power good signal PWROK changes suddenly from a high level to a low level signal. In other words, the PWROK signal can be changed from a low level to a high level slowly, and changed from a high level to a low level rapidly.

In the embodiment, the transistors Q1-Q3 function as electronic switches.

The foregoing description of the exemplary embodiments of the disclosure has been presented only for the purposes of illustration and description and is not intended to be exhaustive or to limit the disclosure to the precise forms disclosed. Many modifications and variations are possible. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than by the foregoing description and the exemplary embodiments described therein.

What is claimed is:

1. A circuit to generate a signal, the circuit comprising:

first to fifth resistors, wherein a first terminal of the first resistor is connected to a first power terminal, a second terminal of the first resistor is grounded through the second resistor; and first to third electronic switches, wherein a control terminal of the first electronic switch is connected to a node between the first and second resistors, a first terminal of the first electronic switch is connected to the first power terminal through the third resistor, a second terminal of the first electronic switch is grounded, the first terminal of the first electronic switch is further connected to control terminals of the second and third electronic switches, a first terminal of the second electronic switch is connected to a second power terminal through the fourth resistor, the first terminal of the second electronic switch further outputs the signal, a second terminal of the second electronic switch is grounded, a first terminal of the third electronic switch is connected to a node between the first and second resistors through the fifth resistor, a second terminal of the third electronic switch is grounded.

2. The circuit of claim 1, further comprising a sixth resistor and a capacitor, wherein the sixth resistor is connected to the node between the first and second resistors and the control terminal of the first electronic switch, a first terminal of the capacitor is connected to the control terminal of the first electronic switch, a second terminal of the capacitor is grounded.

3. The circuit of claim 2, further comprising a diode, wherein an anode of the diode is connected to the control terminal of the first electronic switch, a cathode of the diode is connected to the node between the first and second resistors.

4. The circuit of claim 1, further comprising a seventh resistor, wherein a first terminal of the seventh resistor is connected to the first terminal of the first electronic switch, a second terminal of the seventh resistor is connected to the control terminal of the second electronic switch.

5. The circuit of claim 1, further comprising an eighth resistor, wherein a first terminal of the eighth resistor is connected to the first terminal of the first electronic switch, a second terminal of the eighth resistor is connected to the control terminal of the third electronic switch.

6. The circuit of claim 1, wherein the first power terminal is a standby power, the second power terminal is a dual power, the signal output from the first terminal of the second electronic switch is a power good signal.

7. The circuit of claim 1, wherein each of the first to third electronic switches is a transistor, the control terminal of each electronic switch is a base of the transistor, the first terminal of each electronic switch is a collector of the transistor, the second terminal of each electronic switch is an emitter of the transistor.

* * * * *